United States Patent
Takegawa et al.

(10) Patent No.: US 10,984,247 B2
(45) Date of Patent: Apr. 20, 2021

(54) ACCURATE CORRECTION OF ERRORS IN TEXT DATA BASED ON LEARNING VIA A NEURAL NETWORK

(71) Applicant: FUJITSU LIMITED, Kawasaki (JP)

(72) Inventors: Hiroto Takegawa, Numazu (JP); Yusuke Hamada, Ota (JP); Satoru Sankoda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 94 days.

(21) Appl. No.: 16/549,599

(22) Filed: Aug. 23, 2019

(65) Prior Publication Data

US 2020/0074180 A1    Mar. 5, 2020

(30) Foreign Application Priority Data

Aug. 29, 2018 (JP) .............................. JP2018-160873

(51) Int. Cl.
*G06K 9/00* (2006.01)
*G06N 3/04* (2006.01)

(52) U.S. Cl.
CPC ..... *G06K 9/00718* (2013.01); *G06K 9/00744* (2013.01); *G06N 3/04* (2013.01)

(58) Field of Classification Search
CPC ... G06K 9/00718; G06K 9/00744; G06N 3/04
See application file for complete search history.

(56) References Cited

U.S. PATENT DOCUMENTS

| | | | | |
|---|---|---|---|---|
| 5,251,268 | A * | 10/1993 | Colley | G06K 9/685 |
| | | | | 382/156 |
| 10,402,495 | B1 * | 9/2019 | Rush | G10L 15/197 |
| 10,496,884 | B1 * | 12/2019 | Nguyen | G06N 3/0454 |
| 10,515,625 | B1 * | 12/2019 | Metallinou | G10L 15/26 |
| 2005/0120391 | A1 * | 6/2005 | Haynie | H04H 60/48 |
| | | | | 725/135 |
| 2017/0169853 | A1 * | 6/2017 | Hu | H04N 21/235 |
| 2017/0302989 | A1 * | 10/2017 | Diggins | G06K 9/00744 |
| 2017/0316792 | A1 * | 11/2017 | Chaudhuri | G10L 25/93 |
| 2018/0336183 | A1 * | 11/2018 | Lee | G06F 40/30 |
| 2019/0171711 | A1 * | 6/2019 | Carpenter, II | G10L 13/02 |
| 2019/0349641 | A1 * | 11/2019 | Choi | G10L 15/05 |
| 2020/0104357 | A1 * | 4/2020 | Bellegarda | G06N 7/005 |

FOREIGN PATENT DOCUMENTS

JP        2015-075706        4/2015

OTHER PUBLICATIONS

Olivier Morillot, Laurence Likforman-Sulem, Emmanuèle Grosicki, "New baseline correction algorithm for text-line recognition with bidirectional recurrent neural networks," J. Electron. Imag. 22(2) 023028 (Jun. 21, 2013) (Year: 2013).*

* cited by examiner

*Primary Examiner* — Utpal D Shah
(74) *Attorney, Agent, or Firm* — Fujitsu Patent Center

(57) ABSTRACT

An apparatus generates first context data representing a context of correction target text based on the correction target text, and corrects an error in the correction target text by inputting a character string of the correction target text, the generated first context data, and meta-information corresponding to the correction target text to a neural network that has been trained to correct an error in the correction target text by inputting a character string of text corresponding to training data, second context data representing a context of the text, and meta-information of the text.

12 Claims, 15 Drawing Sheets

F I G . 1
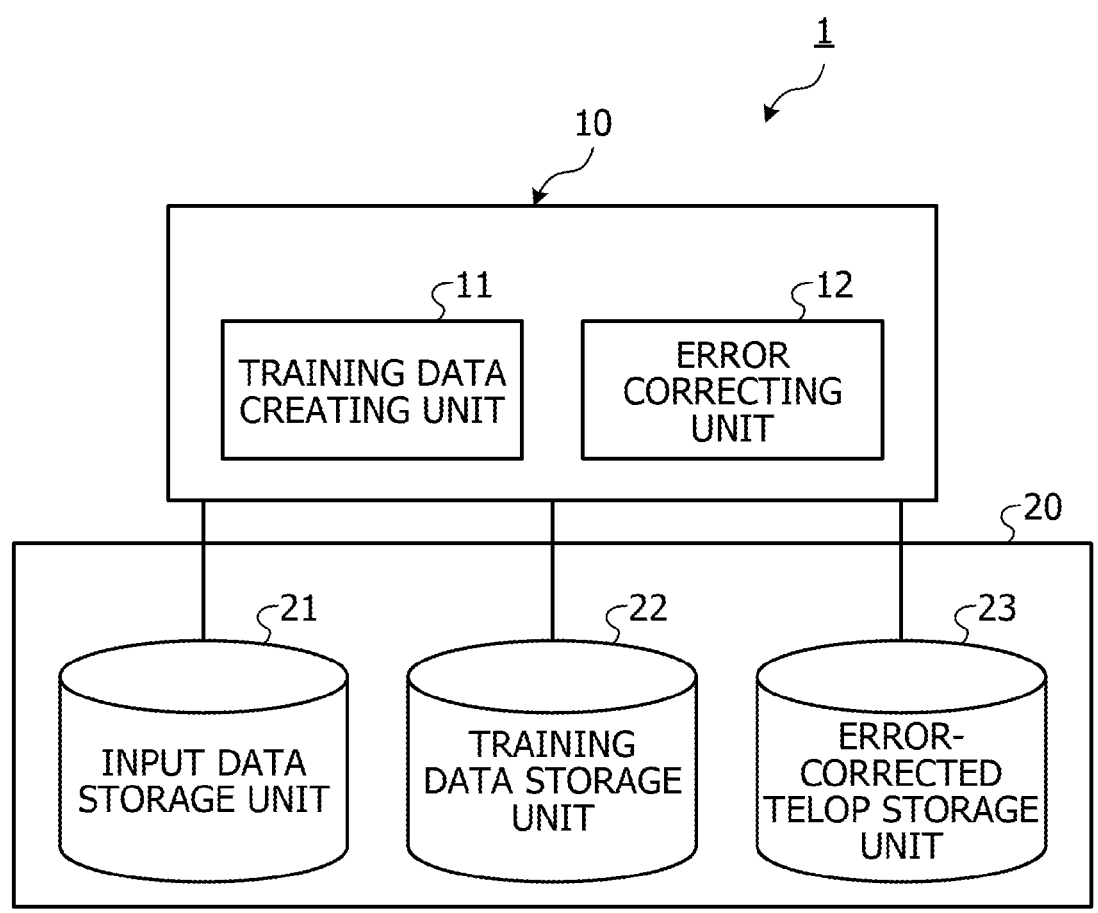

| TIME | TELOP POSITION | IMAGE ATTRIBUTE | TELOP TEXT | VOICE TEXT |
|---|---|---|---|---|
| 0:00:12 | [12,15,22,25] | ANIMAL | TALKING CAT | I AM |
| ⋮ | | | | |
| 0:25:20 | [221,121,255,156] | ANIMAL | PARROT | I AM |

FIG.8

| TELOP POSITION | IMAGE ATTRIBUTE | TELOP TEXT | VOICE TEXT |
|---|---|---|---|
| [12,15,22,25] | ANIMAL | TALKING CAT | I AM |
| ⋮ | | | |
| [221,121,255,156] | ANIMAL | PARROT | I AM |

22a — TELOP POSITION, IMAGE ATTRIBUTE
22c — TELOP TEXT
22b — VOICE TEXT

ACCURATE CORRECTION OF ERRORS IN TEXT DATA BASED ON LEARNING VIA A NEURAL NETWORK

CROSS-REFERENCE TO RELATED APPLICATION

This application is based upon and claims the benefit of priority of the prior Japanese Patent Application No. 2018-160873, filed on Aug. 29, 2018, the entire contents of which are incorporated herein by reference.

FIELD

The embodiments discussed herein are related to accurate correction of errors in text data based on learning via a neural network.

BACKGROUND

When text is generated by recognizing a voice, a caption telop, or the like, errors may be included at a time of the recognition. Thus, conversion and proofreading into correct text may be performed. There is a method using a recurrent neural network (RNN) as a technology that performs this text conversion and proofreading.

A related technology is disclosed in Japanese Laid-open Patent Publication No. 2015-75706.

SUMMARY

According to an aspect of the embodiments, an apparatus generates first context data representing a context of correction target text based on the correction target text, and corrects an error in the correction target text by inputting a character string of the correction target text, the generated first context data, and meta-information corresponding to the correction target text to a neural network that has been trained to correct an error in the correction target text by inputting a character string of text corresponding to training data, second context data representing a context of the text, and meta-information of the text.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a block diagram illustrating an example of a functional configuration of a text generating device according to an embodiment;

FIG. 8 is a diagram of assistance in explaining an example of information generated by meta-information generation;

DESCRIPTION OF EMBODIMENTS

Figure 2:
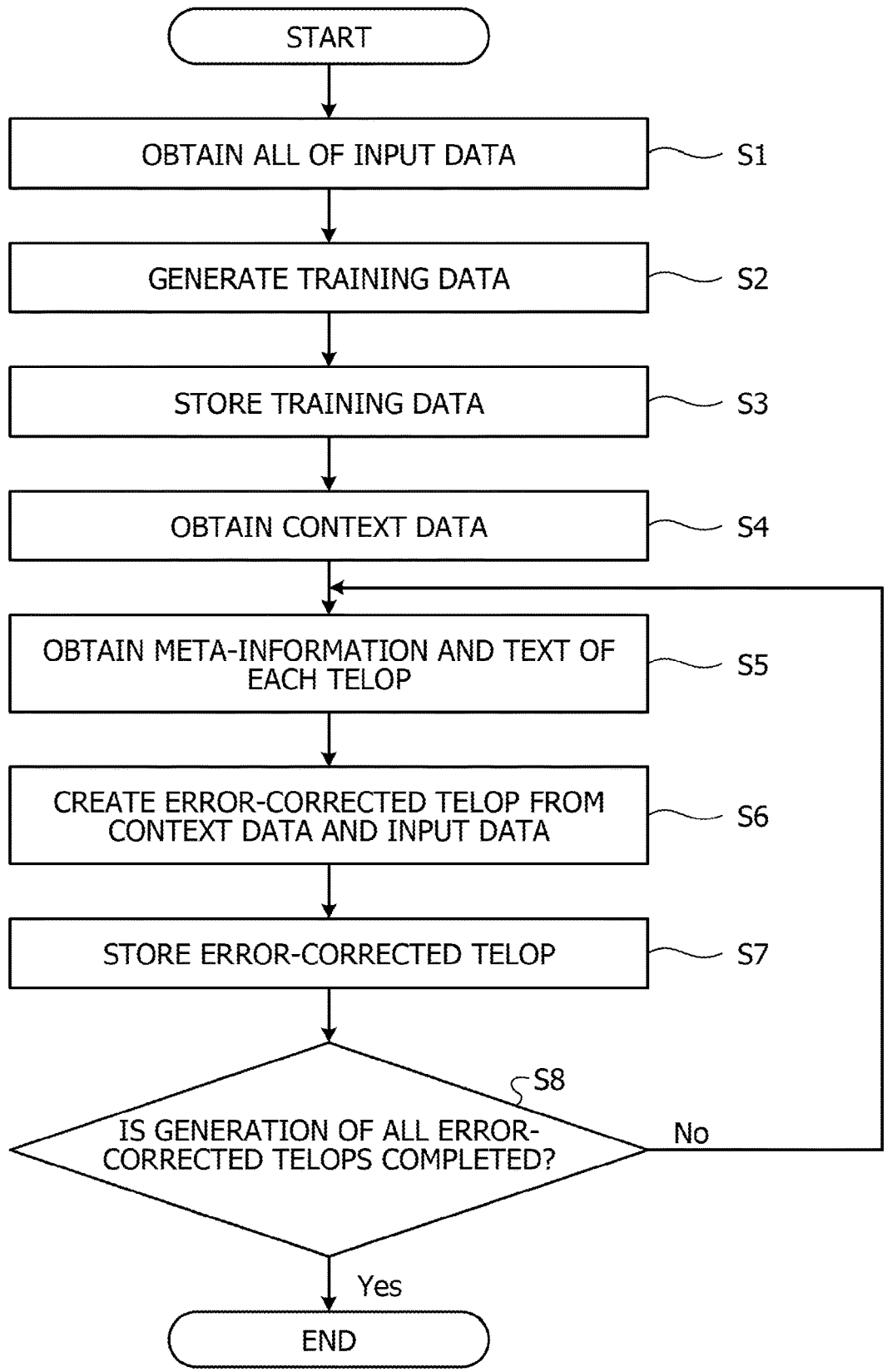
FIG. 2 is a flowchart illustrating an example of operation of a text generating device according to an embodiment.

The above-described technology inputs only text to the RNN and determines errors. Thus, accuracy of text error correction, for example, is limited by the contents of the text, so that sufficient accuracy may not be obtained.

It is preferable to correct errors in the text with high accuracy.

Referring to the drawings, description will hereinafter be made of a text generating device, a text generating program, and a text generating method according to embodiments. In the embodiments, configurations having identical functions are identified by the same reference symbols, and repeated description thereof will be omitted. It is to be noted that the text generating device, the text generating program, and the text generating method to be described in the following embodiments are merely illustrative of an example, and do not limit the embodiments. In addition, the following embodiments may be combined as appropriate within a scope where no inconsistency arises.

FIG. 1 is a block diagram illustrating an example of a functional configuration of a text generating device according to an embodiment. As illustrated in FIG. 1, the text generating device 1 includes a text generation processing unit 10 and a storage unit 20. The text generating device 1 is an information processing device that receives input data related to correction target text, and correct errors included in the correction target text.

For example, the text generating device 1 is a personal computer (PC) or the like. The text generating device 1 receives input data including voice, caption telops (i.e., text superimposed on a screen, such as captions, subtitles, or scrolling tickers), and the like via a communication network (not illustrated) such as a local area network (LAN) or the Internet. Then, the text generating device 1 sets, as a correction target, text recognized from the voice and the caption telops of a moving image included in the input data, corrects errors occurring during the recognition, and outputs the text to a file, a display, or the like.

Incidentally, the present embodiment illustrates a case where caption telops included in a moving image are recognized as text, and errors occurring during the recognition are corrected with the recognized text as a correction target. However, the correction target text is not particularly limited to the caption telops of a moving image. For example, text obtained by conversion from voice to text by voice recognition, an article on a network, or the like may be set as a correction target, and errors included in the text may be corrected (proofread).

The text generation processing unit 10 is a processing unit that performs central control of processing in the text generating device 1, the processing including generating text obtained by correcting errors in the correction target text and the like. The text generation processing unit 10 includes a training data creating unit 11 and an error correcting unit 12.

The training data creating unit 11 is a processing unit that generates training data used for error correction of the correction target text (telops) based on the input data related to the correction target text. The training data creating unit 11 subsequently stores the generated training data in a training data storage unit 22.

Incidentally, the input data related to the correction target text includes, for example, information of a moving image including telops (correction target text), meta-information related to the moving image, and the like. In addition, the meta-information related to the moving image includes, for example, positional information of telops in the moving image, attribute information indicating the content of the moving image, text information of voice included in the moving image, and the like.

The training data creating unit 11, for example, generates context data indicating the context of the text by performing publicly known natural language processing based on the telops included in the moving image of the input data, for example, the correction target text. The training data creating unit 11 is an example of a generating unit. Incidentally, the context data generated by the training data creating unit 11 includes, for example, a context vector in which degrees of co-occurrence of a given word within the text and words appearing in front and in the rear of the word or in the vicinity of the word are arranged according to order of the appearing words.

The error correcting unit 12 is a processing unit that obtains the training data stored in the training data storage unit 22, and performs processing of correcting errors in the correction target text by using a neural network trained by a deep learning technology. The error correcting unit 12 is an example of a correcting unit.

For example, in a learning phase in which learning of the neural network is performed, the error correcting unit 12 inputs, to the neural network, a character string of the text corresponding to the training data, the context data of the text, and the meta-information related to the text, and performs forward propagation thereof. Next, the error correcting unit 12 performs back propagation based on a comparison between the output of the neural network after the forward propagation and a correct answer (correct answer text), adjusts weight parameters at respective nodes of the neural network, and thereby obtains a trained neural network. The error correcting unit 12 thus obtains a trained neural network so as to provide output in which errors included in the text are corrected.

For the trained neural network, the error correcting unit 12 refers to the training data stored in the training data storage unit 22, and inputs a character string of the correction target text, the context data generated from the text, and the meta-information corresponding to the text. The error correcting unit 12 thereby obtains corrected text in which errors included in the correction target text are corrected from the output of the neural network. The error correcting unit 12 stores the obtained corrected text data (corrected telop) in an error-corrected telop storage unit 23.

The storage unit 20 is a storage device such as a hard disk drive (HDD). The storage unit 20 includes an input data storage unit 21, the training data storage unit 22, and the error-corrected telop storage unit 23. The input data storage unit 21 stores the input data related to the correction target text. The training data storage unit 22 stores the training data generated by the training data creating unit 11. The error-corrected telop storage unit 23 stores the corrected text data corrected by the error correcting unit 12.

FIG. 2 is a flowchart illustrating an example of operation of a text generating device according to an embodiment. The text generating device described with reference to FIG. 2 may be the text generating device 1 illustrated in FIG. 1. Incidentally, suppose that the input data storage unit 21 stores a moving image including telops (telop moving image) and meta-information related to the moving image in advance as input data related to correction target text (telops).

As illustrated in FIG. 2, when processing is started, the training data creating unit 11 obtains all of the input data stored in the input data storage unit 21 (S1). Next, the training data creating unit 11 generates training data used for error correction of the correction target text (telops) based on the obtained input data (S2), and stores the generated training data in the training data storage unit 22 (S3).

Figure 3:
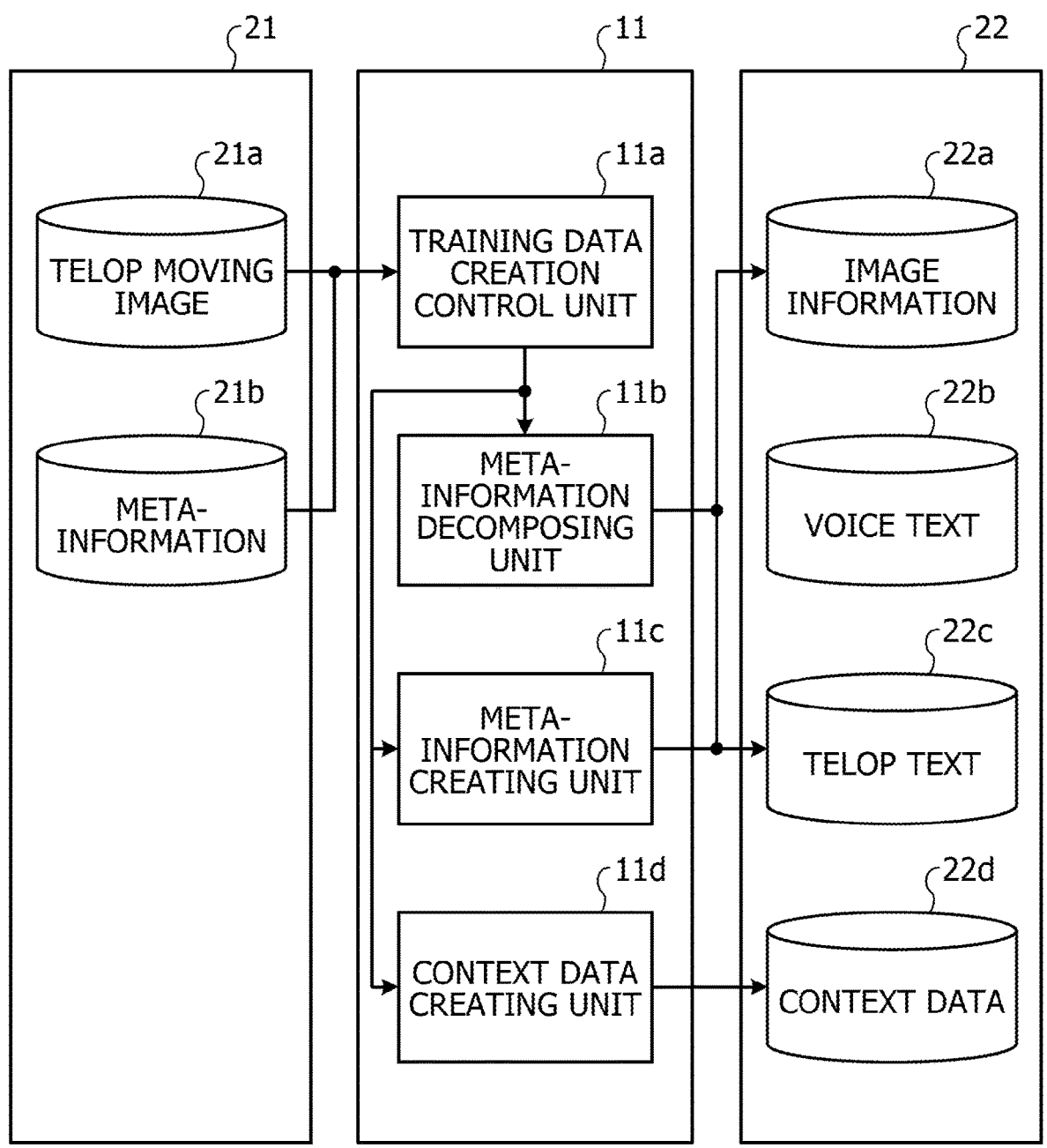
FIG. 3 is a block diagram of assistance in explaining an example of a functional configuration related to training data generation.

Here, detailed description will be made of generation of training data in the training data creating unit 11. FIG. 3 is a block diagram of assistance in explaining an example of a functional configuration related to generation of training data. As illustrated in FIG. 3, the input data storage unit 21 stores a telop moving image 21a related to correction target telops and meta-information 21b related to the moving image.

The training data creating unit 11 includes a training data creation control unit 11a, a meta-information decomposing unit 11b, a meta-information creating unit 11c, and a context data creating unit 11d.

The training data creation control unit 11a is a processing unit that controls processing related to the creation of the training data. In creating the training data, the training data creation control unit 11a obtains the telop moving image 21a and the meta-information 21b from the input data storage unit 21. Next, when the meta-information 21b related to the telop moving image 21a is present, the training data creation control unit 11a outputs the obtained meta-information 21b to the meta-information decomposing unit 11b, and makes the meta-information decomposing unit 11b create the training data by decomposing the meta-information 21b. In addition, when the meta-information 21b is not present, the training data creation control unit 11a outputs the telop moving image 21a to the meta-information creating unit 11c, and instructs the meta-information creating unit 11c to create the training data by creating the meta-information from the telop moving image 21a.

The meta-information decomposing unit 11b is a processing unit that creates the training data such as image information 22a, voice text 22b, and telop text 22c by decomposing the meta-information 21b and shaping the decomposed meta-information into data in forms desired for error estimation. The meta-information decomposing unit 11b stores the image information 22a, the voice text 22b, and the telop text 22c that are created in the training data storage unit 22.

The meta-information creating unit 11c is a processing unit that creates the meta-information based on a moving image and voice included in the telop moving image 21a when the meta-information 21b is not present. Based on the created meta-information, the meta-information creating unit 11c creates training data such as the image information 22a, the voice text 22b, and the telop text 22c, as with the meta-information decomposing unit 11b. The meta-information creating unit 11c stores the image information 22a, the voice text 22b, and the telop text 22c that are created in the training data storage unit 22.

The context data creating unit 11d is a processing unit that creates context data 22d representing the context of telops using all of the telop text 22c. The context data creating unit 11d stores the created context data 22d in the training data storage unit 22.

Figure 4:
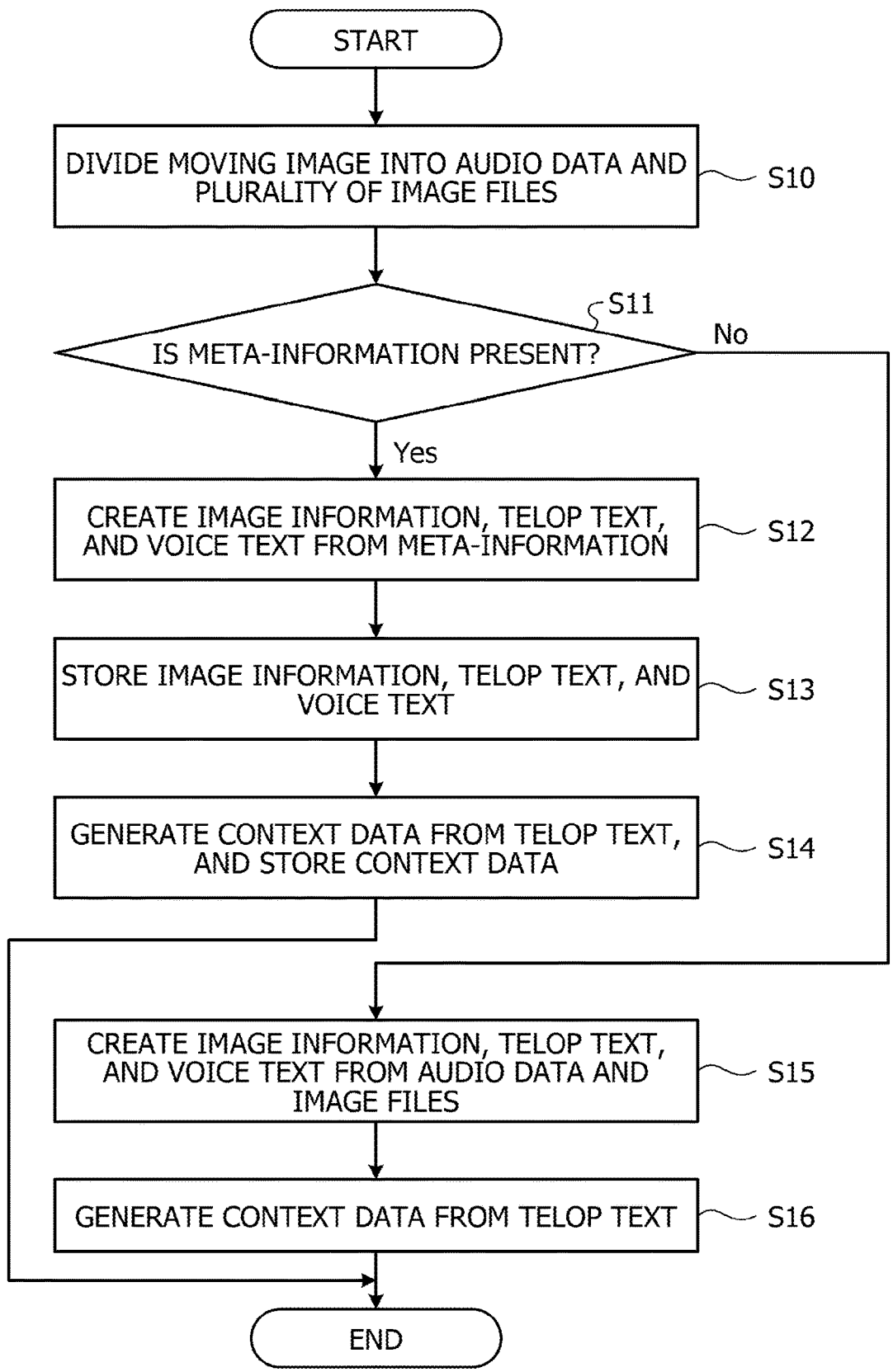
FIG. 4 is a flowchart illustrating an example of processing related to training data generation.

FIG. 4 is a flowchart illustrating an example of processing related to generation of training data. As illustrated in FIG. 4, when the processing is started, the training data creation control unit 11a reads the telop moving image 21a by referring to the input data storage unit 21, and divides the telop moving image 21a into audio data and a plurality of image files of respective frames included in the moving image (S10).

Next, the training data creation control unit 11a refers to the input data storage unit 21, and determines whether or not the meta-information 21b associated with the telop moving image 21a by a tag or the like is present (S11). When the meta-information 21b is not present, the training data creation control unit 11a advances the processing to S15.

When the meta-information 21b is present (S11: YES), the training data creation control unit 11a reads the meta-information 21b related to the telop moving image 21a, and outputs the read meta-information 21b to the meta-information decomposing unit 11b. Next, the meta-information decomposing unit 11b creates the image information 22a, the telop text 22c, and the voice text 22b from the meta-information 21b (S12), and stores the image information 22a, the telop text 22c, and the voice text 22b that are created in the training data storage unit 22 (S13). Next, the context data creating unit 11d generates the context data 22d from the telop text 22c created by the meta-information creating unit 11c, and stores the context data 22d in the training data storage unit 22 (S14).

Figures 5, 6:
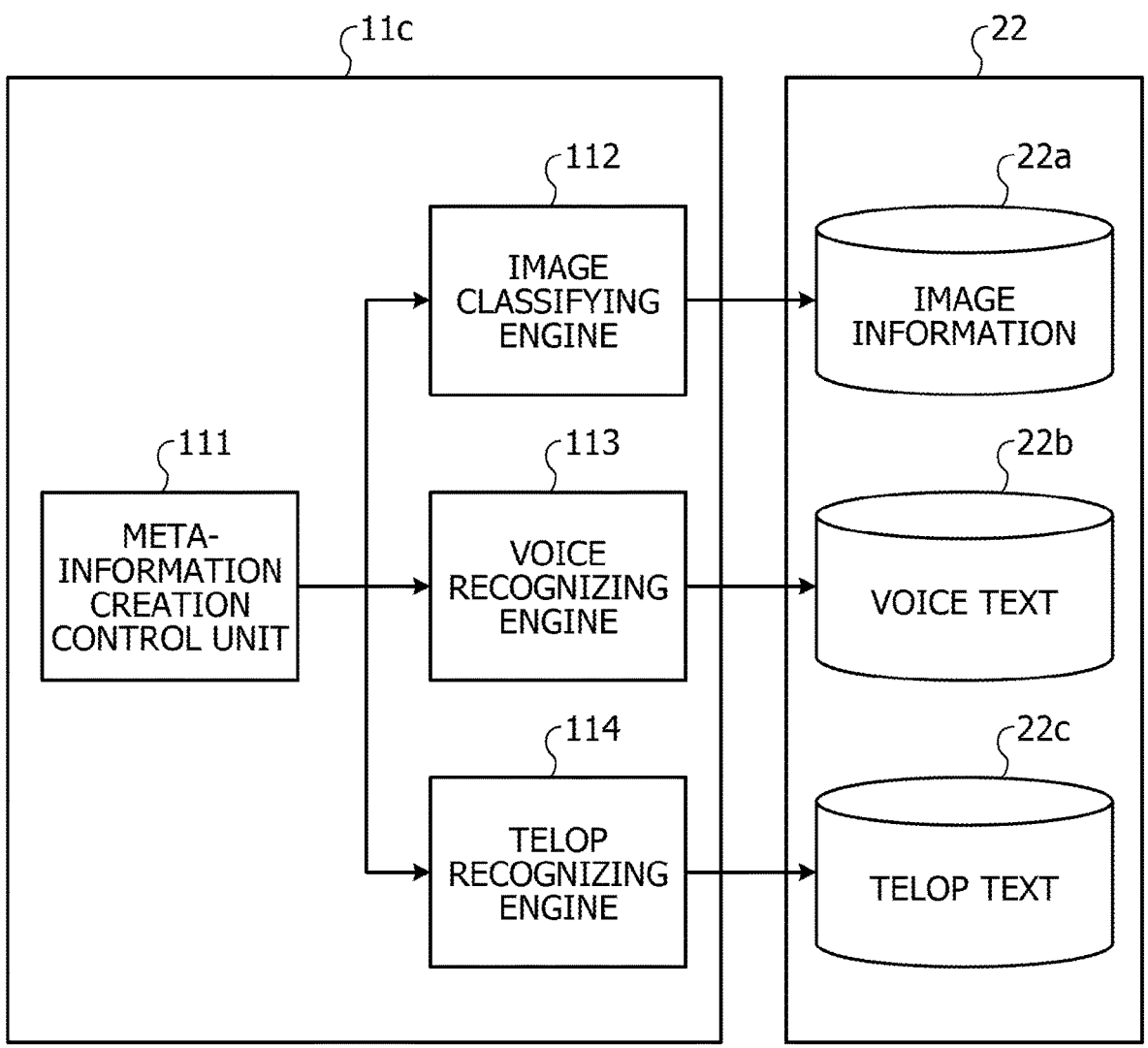
FIG. 5 is a diagram of assistance in explaining an example of meta-information.
FIG. 6 is a block diagram illustrating an example of a functional configuration related to meta-information generation.

FIG. 5 is a diagram of assistance in explaining an example of meta-information. The meta-information in FIG. 5 may be the meta-information 21b illustrated in FIG. 3. As illustrated in FIG. 5, the meta-information 21b, for example, describes information regarding a telop position, an image attribute indicating the content of an image, telop text, and voice text indicating the content of voice at each time indicated by a time code of the telop moving image 21a.

The meta-information decomposing unit 11b decomposes the telop position, the image attribute, the telop text, and the voice text at each time in the meta-information 21b into the image information 22a, the voice text 22b, and the telop text 22c. For example, the meta-information decomposing unit 11b decomposes the image attribute together with the time code indicating the time from the meta-information 21b into the image information 22a, and stores the image information 22a in the training data storage unit 22. In addition, the meta-information decomposing unit 11b decomposes the voice text together with the time code from the meta-information 21b into the voice text 22b, and stores the voice text 22b in the training data storage unit 22. In addition, the meta-information decomposing unit 11b decomposes the telop position and the telop text together with the time code from the meta-information 21b into the telop text 22c, and stores the telop text 22c in the training data storage unit 22.

When the meta-information 21b is not present (S11: NO), the training data creation control unit 11a reads the telop moving image 21a, and outputs the read telop moving image 21a to the meta-information creating unit 11c. Next, the meta-information creating unit 11c creates the meta-information, for example, the image information, the telop text, and the voice text from the audio data and the image files included in the telop moving image 21a (S15).

FIG. 6 is a block diagram illustrating an example of a functional configuration related to generation of meta-information. As illustrated in FIG. 6, the meta-information creating unit 11c includes a meta-information creation control unit 111, an image classifying engine 112, a voice recognizing engine 113, and a telop recognizing engine 114.

The meta-information creation control unit 111 is a processing unit that controls processing related to the generation of the meta-information. The meta-information creation control unit 111 passes the image files to the image classifying engine 112 and the telop recognizing engine 114 from the telop moving image 21a from which to create the meta-information, and passes the audio data to the voice recognizing engine 113 from the telop moving image 21a.

The image classifying engine 112 is a processing unit that classifies image attributes by performing publicly known image recognition processing based on the image files. For example, the image classifying engine 112 recognizes objects included in images by publicly known image recognition processing. Next, the image classifying engine 112 determines attributes corresponding to the recognized objects, creates data (image information 22a) classified by the attributes indicating the contents of the images, and stores the data in the training data storage unit 22.

The voice recognizing engine 113 is a processing unit that recognizes voice by performing publicly known voice recognition processing based on the audio data. The voice recognizing engine 113 converts the recognized voice into the voice text 22b, and stores the voice text 22b in the training data storage unit 22.

The telop recognizing engine 114 is a processing unit that recognizes telops included in the images by performing publicly known image recognition processing based on the image files. The telop recognizing engine 114 recognizes the positions of the telops in the images and the text of the telops by publicly known image recognition processing, and stores the positions and the text that are recognized as the telop text 22c in the training data storage unit 22.

Figure 7:
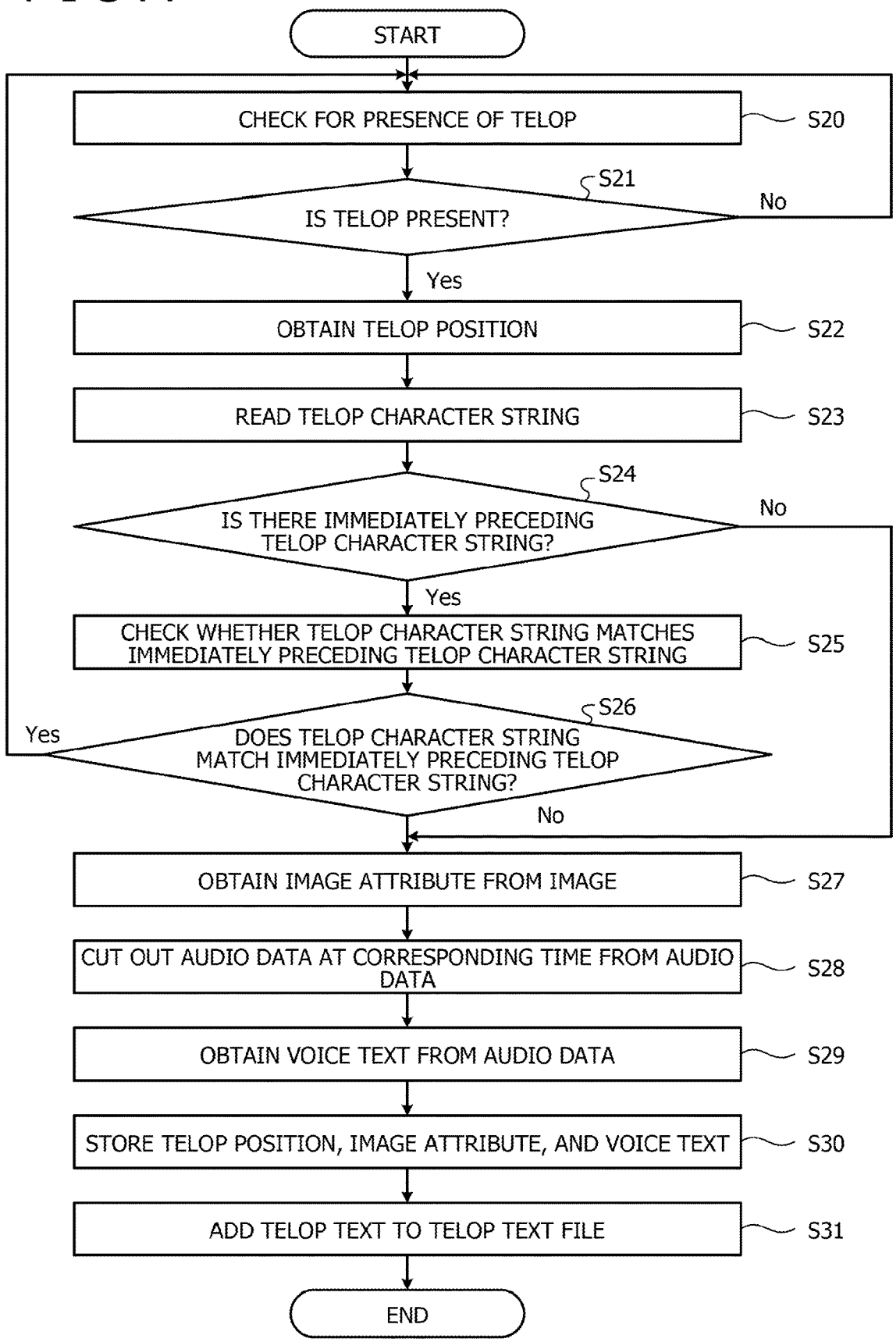
FIG. 7 is a flowchart illustrating an example of processing related to meta-information generation.

FIG. 7 is a flowchart illustrating an example of processing related to generation of meta-information. As illustrated in FIG. 7, when the processing is started, the meta-information creation control unit 111 checks for the existence of a telop in an image (each frame) by the telop recognizing engine 114 (S20), and determines whether or not a telop is present in the image (S21).

When no telop is present (S21: NO), the meta-information creation control unit 111 returns the processing to S20, and waits to perform the processing until a frame in which a telop is present is obtained.

When a telop is present (S21: YES), the meta-information creation control unit 111 obtains the position of the telop from the frame by the telop recognizing engine 114 (S22), and reads the character string (telop text) of the telop at the obtained position (S23).

Next, the meta-information creation control unit 111 determines whether or not there is a character string of a telop read in an immediately preceding frame (S24). When there is no such character string (S24: NO), the meta-information creation control unit 111 advances the processing to S27.

When there is a character string of a telop read in an immediately preceding frame (S24: YES), the meta-information creation control unit 111 checks and determines whether or not the character string of the immediately preceding telop and the character string of the telop read from the present frame match each other (S25 and S26). When the character string of the immediately preceding telop and the character string of the telop read from the present frame match each other (S26: YES), the same telop is consecutively displayed in the immediately preceding frame and the present frame, and therefore the meta-information creation control unit 111 returns the processing to S20.

When the character string of the immediately preceding telop and the character string of the telop read from the present frame do not match each other (S26: NO), the meta-information creation control unit 111 obtains an attribute of the image (frame) from the image as a target of processing by the image classifying engine 112 (S27). Next, the meta-information creation control unit 111 cuts out audio data at a corresponding time from the audio data of the telop moving image 21a (S28), and outputs the cut-out audio data to the voice recognizing engine 113. Next, the voice recognizing engine 113 obtains voice text 22b from the audio data (S29).

Next, the meta-information creation control unit 111 stores the telop position, the image attribute, and the voice text obtained in S22, S27, and S29 as image information 22a and voice text 22b in the training data storage unit 22 (S30). Next, the meta-information creation control unit 111 adds the telop text read in S23 to the telop text 22c (S31).

Next, the meta-information creation control unit 111 ends the processing when the processing is ended up to a last frame of the telop moving image 21a. Incidentally, when the processing is not ended up to the last frame, the meta-information creation control unit 111 sets a next frame as a processing target, and returns the processing to S20.

FIG. 8 is a diagram of assistance in explaining an example of information generated by meta-information generation. As illustrated in FIG. 8, the image information 22a, the telop text 22c, and the voice text 22b are generated for each time of the telop moving image 21a by performing the processing illustrated in FIG. 7 on the telop moving image 21a.

Returning to FIG. 4, following S15, the context data creating unit 11d creates the context data 22d representing the context of telops (text) using all the text of the telop text 22c (S16), and stores the context data 22d in the training data storage unit 22.

Here, description will be made of the generation of the context data in S14 and S16. In the present embodiment, the generation of the context data and the correction of the text are performed by using a neural network trained in a learning phase by the deep learning technology. For example, the neural network trained so as to generate the context data or correct the text is applied in an inference phase, and thereby the context data and a result of correction of the text are obtained as a result of inference by the neural network.

Figure 9:
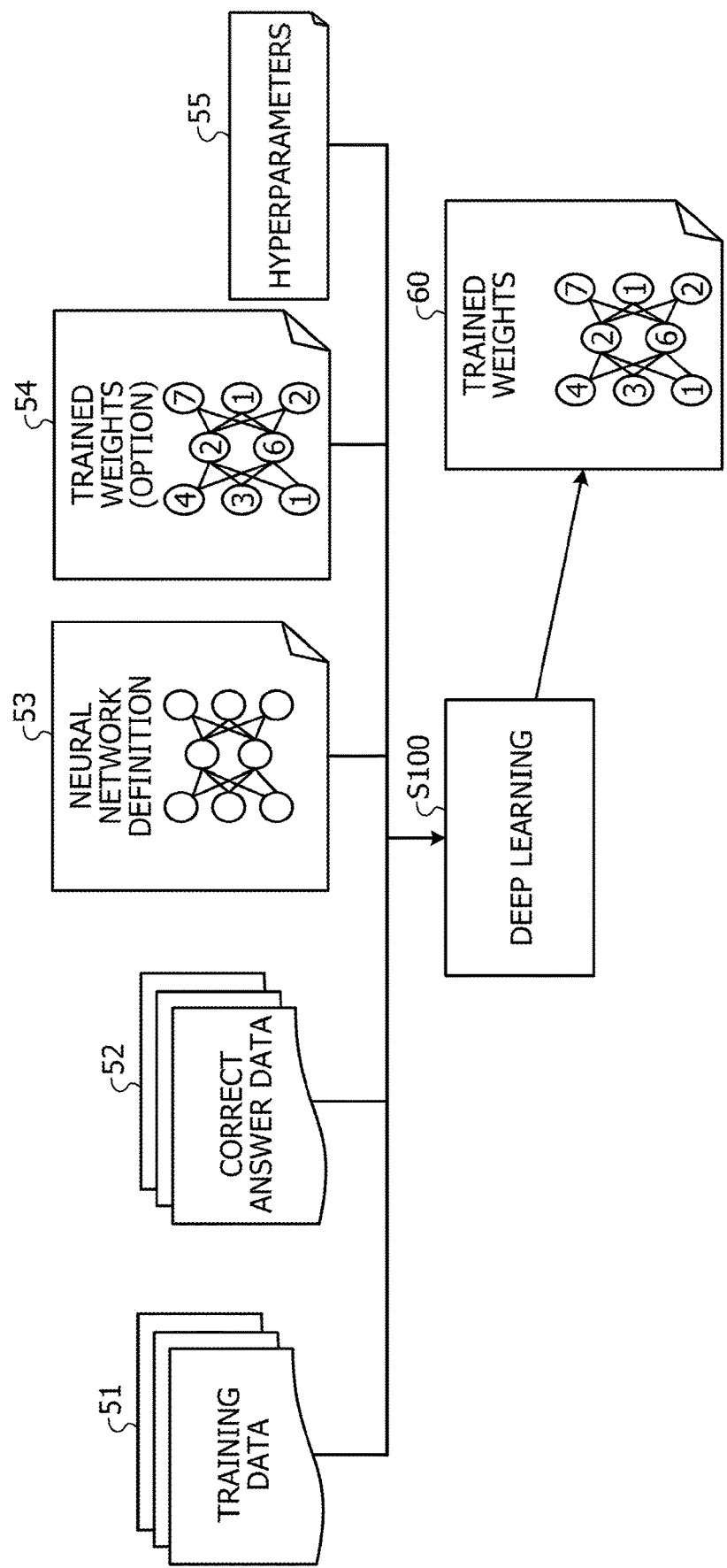
FIG. 9 is a diagram of assistance in explaining an example of a learning phase.

FIG. 9 is a diagram of assistance in explaining an example of a learning phase. As illustrated in FIG. 9, in deep learning (S100), an initial neural network is constructed by using a neural network definition 53, trained weights (option) 54, and hyperparameters 55. Next, in deep learning, training data 51 and correct answer data 52 are applied to the constructed neural network, and the neural network is trained so as to perform the generation of the context data or the correction of the text.

For example, in deep learning (S100), a difference (loss) between an inference result obtained by forward propagation of the training data 51 through the neural network and the correct answer data 52 is obtained. Next, the obtained difference is subjected to back propagation through the neural network, and the parameters of respective nodes of the neural network are changed and brought close to an optimum solution. As a result of such deep learning (S100), the parameters of the respective nodes in the neural network are obtained as trained weights 60.

Figure 10:
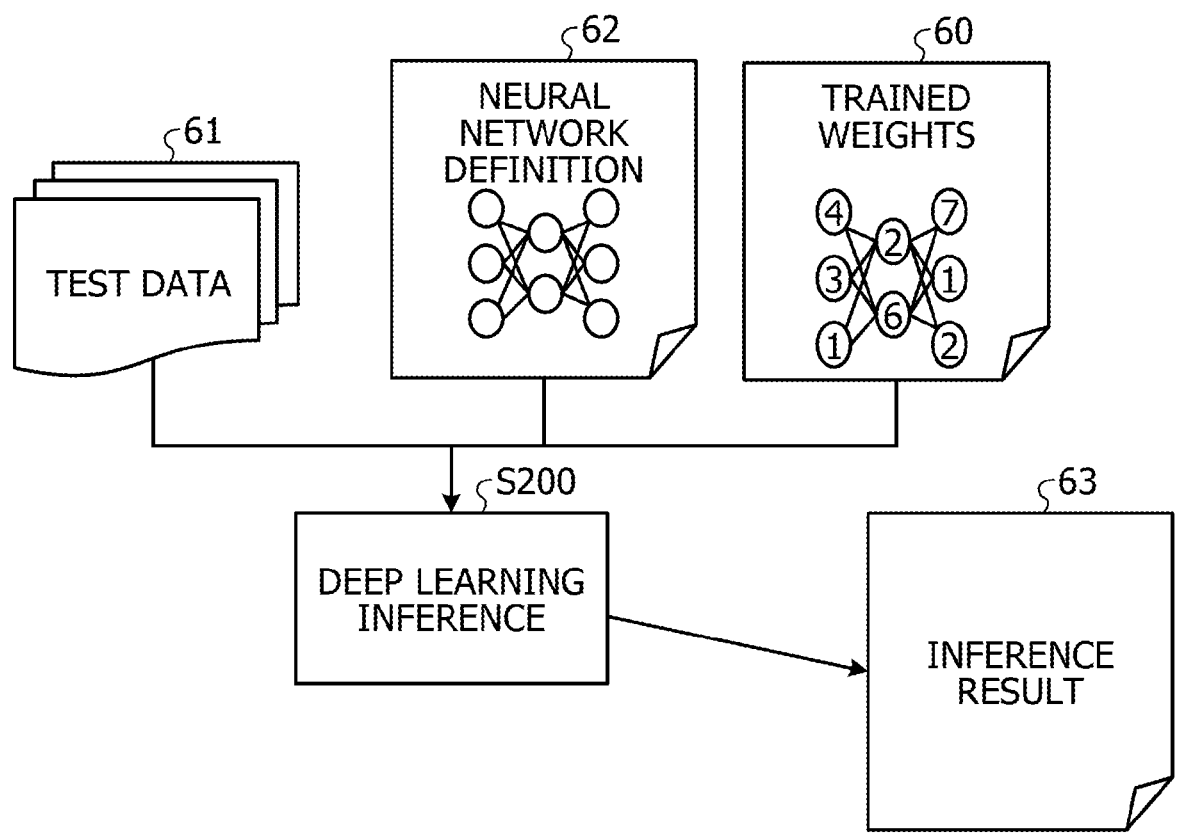
FIG. 10 is a diagram of assistance in explaining an example of an inference phase.

FIG. 10 is a diagram of assistance in explaining an example of an inference phase. As illustrated in FIG. 10, in deep learning inference (S200), a neural network is constructed based on the trained weights 60 obtained in the learning phase and a neural network definition 62. Next, in deep learning inference (S200), test data 61 as a target of context data generation, text correction, or the like is applied to the neural network. It is thereby possible to obtain an inference result 63 such as context data or text after correction.

Figure 11:
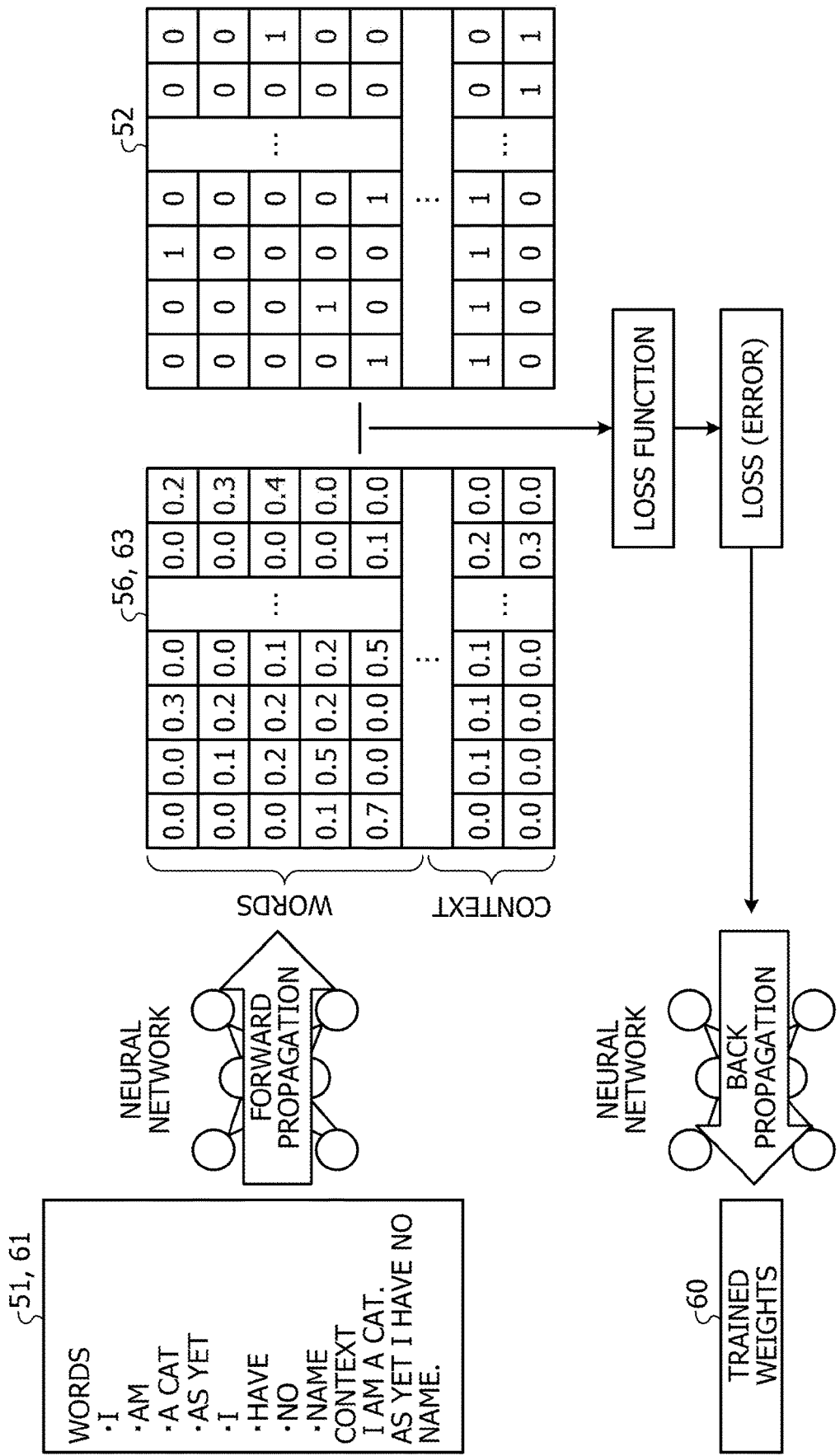
FIG. 11 is a diagram of assistance in explaining learning and inference for context data generation.

FIG. 11 is a diagram of assistance in explaining learning and inference for context data generation. As illustrated in FIG. 11, prepared in learning for generating context data are training data 51 representing words appearing along a context and correct answer data 52 as the context data of a correct answer.

In deep learning (S100), a loss (error) between an inference result 56 obtained by performing forward propagation of the training data 51 through the neural network and the correct answer data 52 is obtained by a loss function. Next, the obtained loss is subjected to back propagation through the neural network, and the parameters of respective nodes of the neural network are changed and brought close to an optimum solution. Trained weights 60 for generating the context data are thereby obtained.

In addition, in deep learning inference (S200), for text from which to generate the context data, test data 61 representing words appearing along a context is subjected to forward propagation through the neural network. Thus, an inference result 63 inferring the context data is obtained. Incidentally, the inference result 63 represents a context vector in which degrees of co-occurrence of a given word within the text and words appearing in front and in the rear of the word or in the vicinity of the word are arranged according to order of the appearing words.

Figure 12:
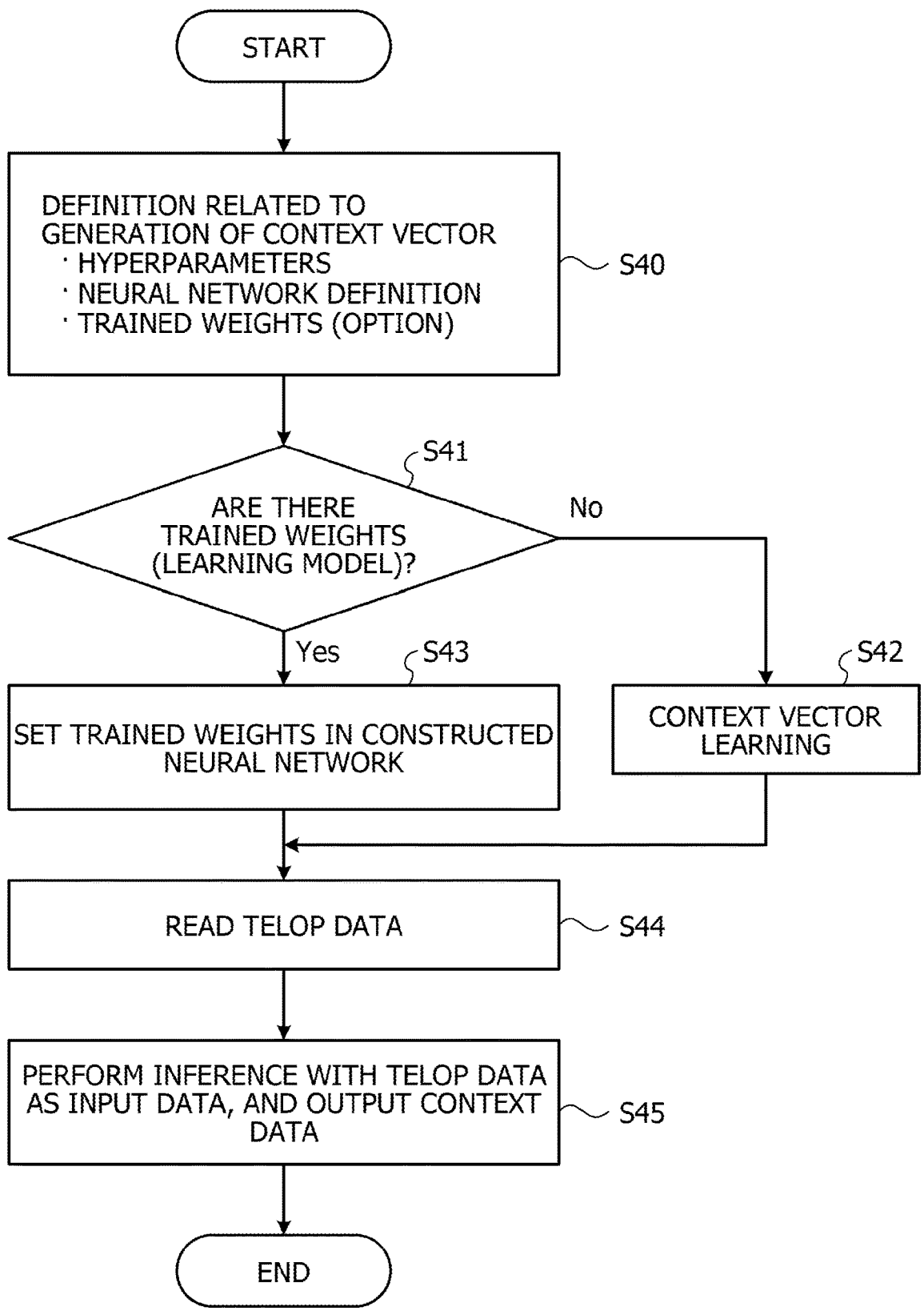
FIG. 12 is a flowchart illustrating an example of processing related to context data generation.

FIG. 12 is a flowchart illustrating an example of processing related to context data generation. As illustrated in FIG. 12, when the processing is started, the context data creating unit 11d performs definition related to deep learning (the hyperparameters 55, the neural network definition 53, and the trained weights (option) 54) (S40). Next, the context data creating unit 11d determines the presence or absence of the trained weights 60 (learning model) (S41). When learning is not yet performed and there are no trained weights 60 (S41: NO), the context data creating unit 11d performs learning by the above-described deep learning (S100) (S42). When learning is already performed and there are trained weights 60 (S41: YES), the context data creating unit 11d advances the processing to S43.

In S43, the context data creating unit 11d sets the trained weights 60 constructed in the deep learning in the neural network, and reads telop data (all the text of the telop text 22c) from which to generate the context data (S44). Next, the context data creating unit 11d infers the context data with the read telop data as the input data of the neural network (test data 61), and outputs an inference result 63 (context data) (S45).

Figure 13:
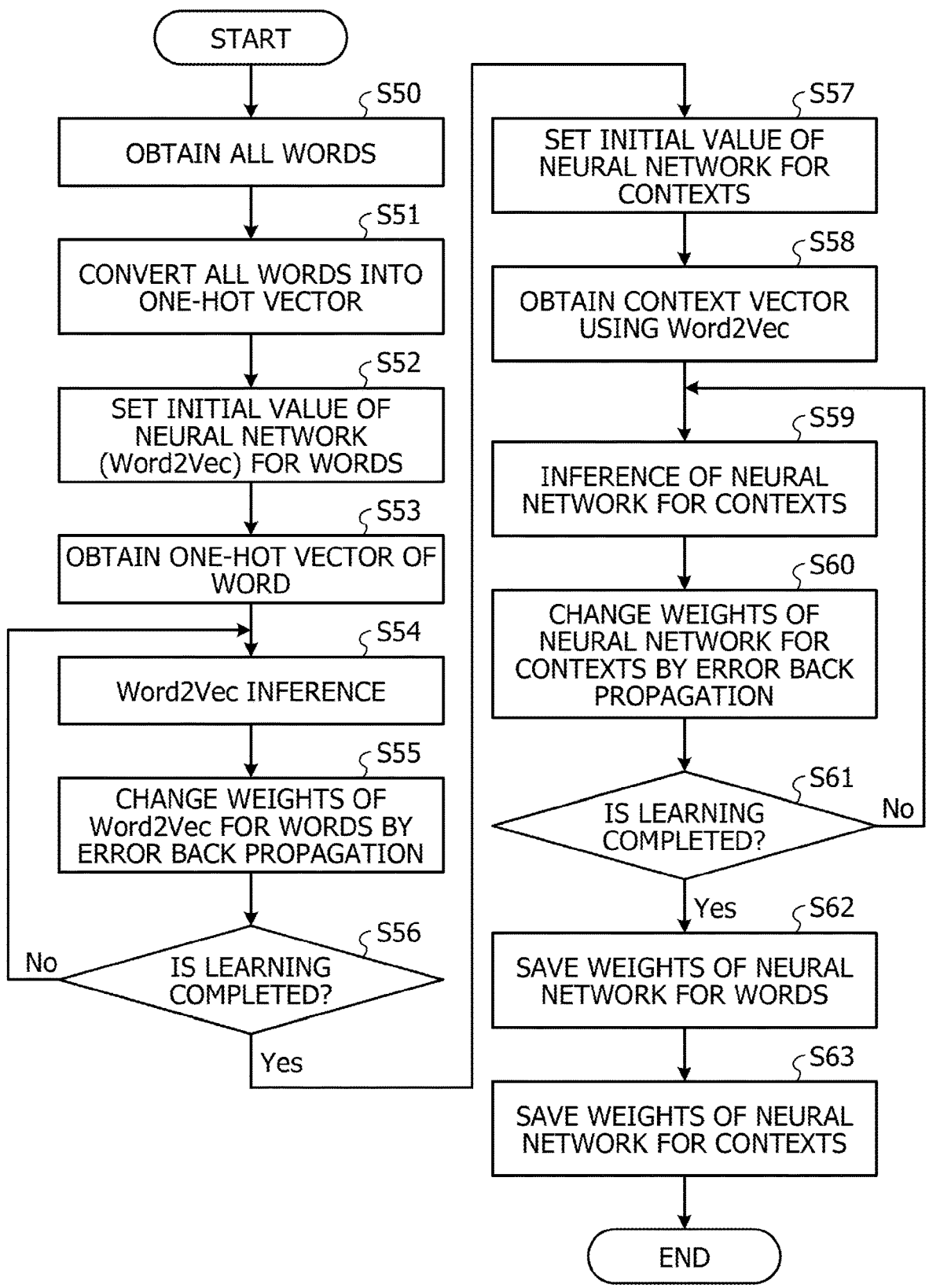
FIG. 13 is a flowchart illustrating an example of processing related to context data learning.

Details of context vector learning (S42) will be described in the following. FIG. 13 is a flowchart illustrating an example of processing related to context data learning.

As illustrated in FIG. 13, when the processing of the context data learning is started, the context data creating unit 11d obtains all words included in text as training data 51 (S50).

Next, the context data creating unit 11d converts all of the obtained words into a one-hot vector (S51), and sets an initial value of the neural network for words (S52). The neural network for words is, for example, Word2Vec vectorizing the features of the words.

Next, the context data creating unit 11d obtains the one-hot vector of a given word from among all of the words (S53), inputs the one-hot representation to the neural network for words, and thereby performs Word2Vec inference (S54). Next, the context data creating unit 11d compares an inference result of WordVec and the word vector of a correct answer included in the correct answer data 52, and updates the weights of Word2Vec for words (neural network for words) by error back propagation based on a result of the comparison (S55).

Next, the context data creating unit 11d determines whether or not a given ending condition (for example, whether input to the neural network is completed or an error obtained by the loss function becomes less than a given threshold value) is satisfied and the learning of the neural network for words is completed (S56). When the learning of the neural network for words is not completed (S56: NO), the context data creating unit 11d returns the processing to S54, and continues the learning using the words of the training data 51.

When the learning of the neural network for words is completed (S56: YES), the context data creating unit 11d sets an initial value of a neural network for contexts (S57). Next, the context data creating unit 11d obtains a context vector using Word2Vec (S58), and performs inference of the neural network for contexts (S59).

Next, the context data creating unit 11d compares an inference result of the neural network for contexts and a correct answer included in the correct answer data 52, and updates the weights of the neural network for contexts by error back propagation based on a result of the comparison (S60).

Next, the context data creating unit 11d determines whether or not a given ending condition (for example, whether input to the neural network is completed or an error obtained by the loss function becomes less than a given threshold value) is satisfied and the learning of the neural network for contexts is completed (S61). When the learning of the neural network for contexts is not completed (S61: NO), the context data creating unit 11d returns the processing to S59, and continues the learning of the neural network for contexts.

When the learning of the neural network for contexts is completed (S61: YES), the context data creating unit 11d saves the weights of the neural network for words and the weights of the neural network for contexts (S62 and S63), and then ends the processing.

Returning to FIG. 2, following S3, the error correcting unit 12 obtains the context data 22d stored in the training data storage unit 22 (S4). Next, the error correcting unit 12 obtains the meta-information and text of each telop from the image information 22a, the voice text 22b, and the telop text 22c stored in the training data storage unit 22 (S5). For example, the error correcting unit 12 obtains a telop position, an image attribute, telop text, and voice text of the information of one telop for a common time stamp from the training data storage unit 22.

Next, the error correcting unit 12 creates an error-corrected telop (text) by using the neural network trained by the deep learning technology from the obtained context data 22d and input data (the telop position, the image attribute, the telop text, and the voice text) (S6). Next, the error correcting unit 12 stores the created error-corrected telop in the error-corrected telop storage unit 23 together with a time code or the like (S7).

Figure 14:
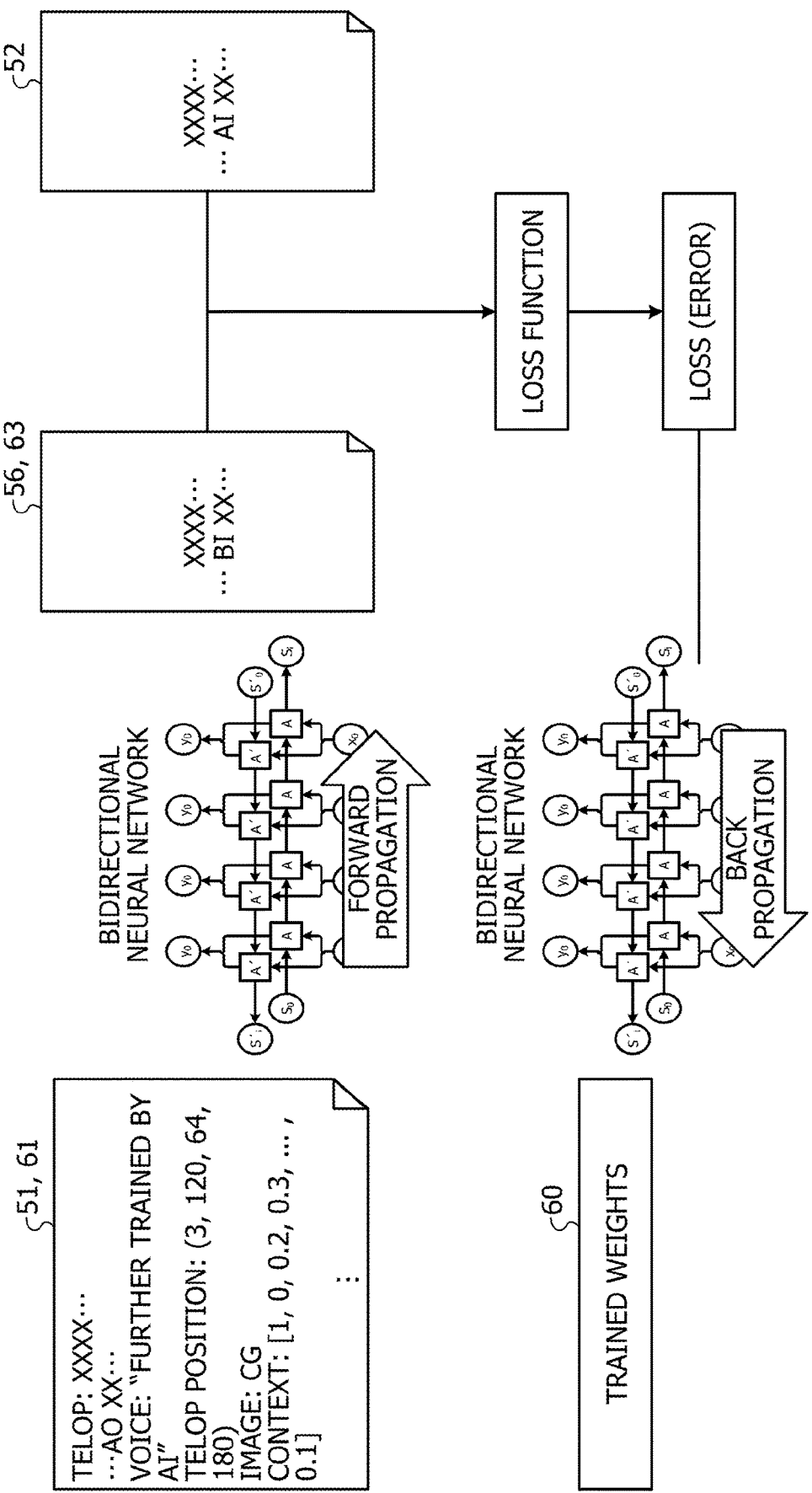
FIG. 14 is a diagram of assistance in explaining learning and inference for error correction.

FIG. 14 is a diagram of assistance in explaining learning and inference for error correction. As illustrated in FIG. 14, prepared in the learning for error correction of a telop (text) are training data 51, which represents the telop (text), voice, a telop position, an image (attribute), and context data, and correct answer data 52 as the text of a correct answer.

In deep learning (S100), a loss (error) between an inference result 56 obtained by forward propagation of the training data 51 through the neural network and the correct answer data 52 is obtained by a loss function.

Incidentally, suppose that the neural network for error correction is a bidirectional neural network that receives input of the character string of text from both a forward direction and a backward direction of arrangement order of the character string, and outputs an error-corrected character string in the forward direction. For example, the telop in the training data 51 is input to the neural network from both the forward direction and the backward direction of the arrangement order.

Next, the obtained loss is subjected to back propagation through the neural network, and the parameters of respective nodes of the neural network are changed and brought close to an optimum solution. Trained weights 60 for correcting errors in the text are thereby obtained.

For example, in the illustrated example, the trained weights 60 are obtained which are trained such that an error of "BI" included in the text of "XXXX . . . BI XX . . . " is set as "AI" according to the correct answer data 52.

In addition, in deep learning inference (S200), for the text (telop) as a correction target, test data 61 representing a voice, a telop position, an image (attribute), and context data are subjected to forward propagation through the neural network together with the text. An inference result 63 is thereby obtained in which errors included in the text are corrected.

Figure 15:
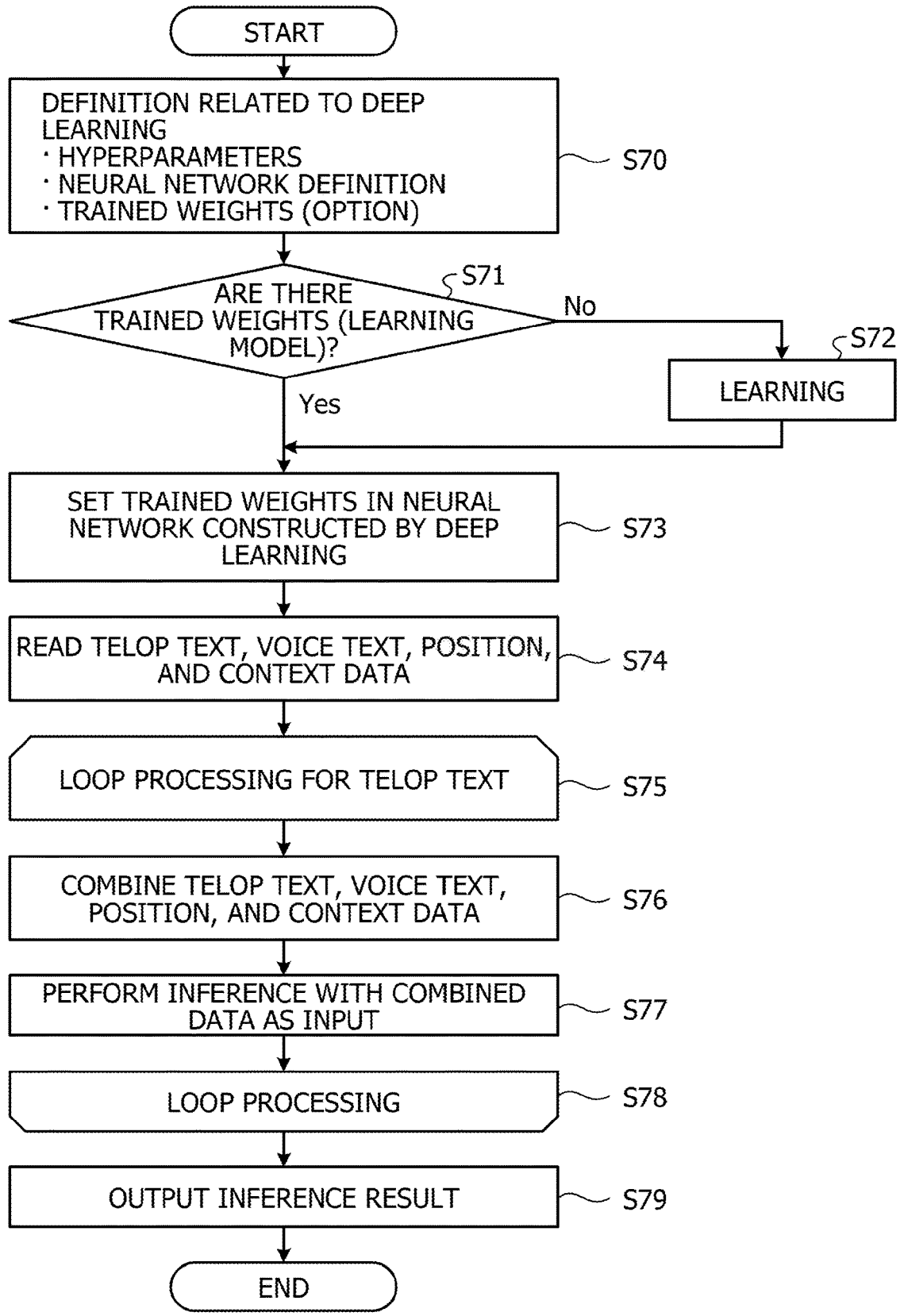
FIG. 15 is a flowchart illustrating an example of processing related to error correction.

FIG. 15 is a flowchart illustrating an example of processing related to error correction. As illustrated in FIG. 15, when the processing is started, the error correcting unit 12 performs definition related to deep learning (the hyperparameters 55, the neural network definition 53, and the trained weights (option) 54) (S70). Next, the error correcting unit 12 determines the presence or absence of the trained weights 60 (learning model) (S71). When learning is not yet performed and there are no trained weights 60 (S71: NO), the error correcting unit 12 performs learning by the above-described deep learning (S100) (S72). When learning is already performed and there are trained weights 60 (S71: YES), the error correcting unit 12 advances the processing to S73.

In S73, the error correcting unit 12 sets the trained weights 60 constructed in the deep learning in the neural network (S73). Next, the error correcting unit 12 reads the telop text 22c, the voice text 22b, a position (telop position), the image information 22a, and the context data 22d from the training data storage unit 22 (S74).

Next, the error correcting unit 12 performs loop processing (S75) for each word of the telop text 22c. For example, the error correcting unit 12 combines the telop text 22c, the voice text 22b, the position (telop position), the image information 22a, and the context data 22d that are related to the word as a processing target (S76). Next, the error correcting unit 12 performs inference of text in which errors are corrected with the combined data as input data (test data 61) of the neural network (S77).

After the above-described loop processing (S75), the error correcting unit 12 outputs an inference result 63 of the text in which errors are corrected (S79), and then ends the processing.

Returning to FIG. 2, following S7, the error correcting unit 12 performs the processing for each telop on all of the text, and determines whether or not generation of all of corrected telops is completed (S8).

When the generation of all of corrected telops is not completed (S8: NO), the error correcting unit 12 returns the processing to S5. When the generation is completed (S8: YES), the error correcting unit 12 stores the error-corrected telops (text) in the error-corrected telop storage unit 23, and then ends the processing.

As described above, the text generating device 1 includes the training data creating unit 11 and the error correcting unit 12. The training data creating unit 11 generates context data representing the context of correction target text based on the text. For example, context date may be a context vector in which degrees of co-occurrence of a given word within the text and words appearing in front and in the rear of the word or in the vicinity of the word are arranged according to order of the appearing words. The error correcting unit 12 corrects an error in the correction target text by inputting a character string of the correction target text, the generated context data, and meta-information corresponding to the text to a neural network that receives, as input, a character string of text corresponding to training data, context data of the text, and meta-information, and is trained so as to correct an error in the text. Hence, in the text generating device 1, in addition to the correction target text, the context data representing the context of the text and the meta-information corresponding to the text are input to the neural network to correct errors. It is therefore possible to correct errors in the text with high accuracy.

In addition, the correction target text in the text generating device 1 is a telop of a moving image, and the meta-information is at least one of a position of the telop in the moving image, an attribute of the moving image, and voice text indicating contents of voice. Hence, the text generating device 1 may correct errors in the telop of the moving image with high accuracy based on the meta-information that is at least one of the position of the telop in the moving image, the attribute of the moving image, and the voice text indicating the contents of the voice.

In addition, the neural network in the error correcting unit 12 is a bidirectional neural network that receives input of the character string of the correction target text from both a forward direction and a backward direction of arrangement order of the character string, and outputs the character string in which an error is corrected. Thus, the text generating device 1 corrects the error based on the bidirectional arrangement order of the character string of the correction target text by using the bidirectional neural network. The text generating device 1 may therefore make the correction with higher accuracy as compared with a case where the correction is made in one direction that is the forward direction or the backward direction.

Processing procedures, control procedures, specific names, and information including various kinds of data and parameters that are illustrated in the document and in the drawings may be changed arbitrarily. In addition, concrete examples, distributions, numerical values, and the like described in the embodiment are mere examples, and may be changed arbitrarily.

In addition, the constituent elements of the respective devices illustrated in the figures are functionally conceptual constituent elements, and do not necessarily need to be physically configured as illustrated in the figures. For example, specific forms of distribution and integration of the devices are not limited to those illustrated in the figures. For example, the whole or a part of the devices may be configured so as to be distributed and integrated functionally or physically in arbitrary units according to various kinds of loads, usage conditions, and the like.

In addition, the whole or an arbitrary part of various kinds of processing functions performed in the text generating device 1 may be performed on a central processing unit (CPU) (or a microcomputer such as a micro processing unit (MPU) or a micro controller unit (MCU)). In addition, it is needless to say that the whole or an arbitrary part of the various kinds of processing functions may be performed on a program analyzed and executed by the CPU or the like or on hardware based on wired logic. In addition, the various kinds of processing functions performed in the text generating device 1 may be performed with a plurality of computers cooperating with each other by cloud computing.

Figure 16:
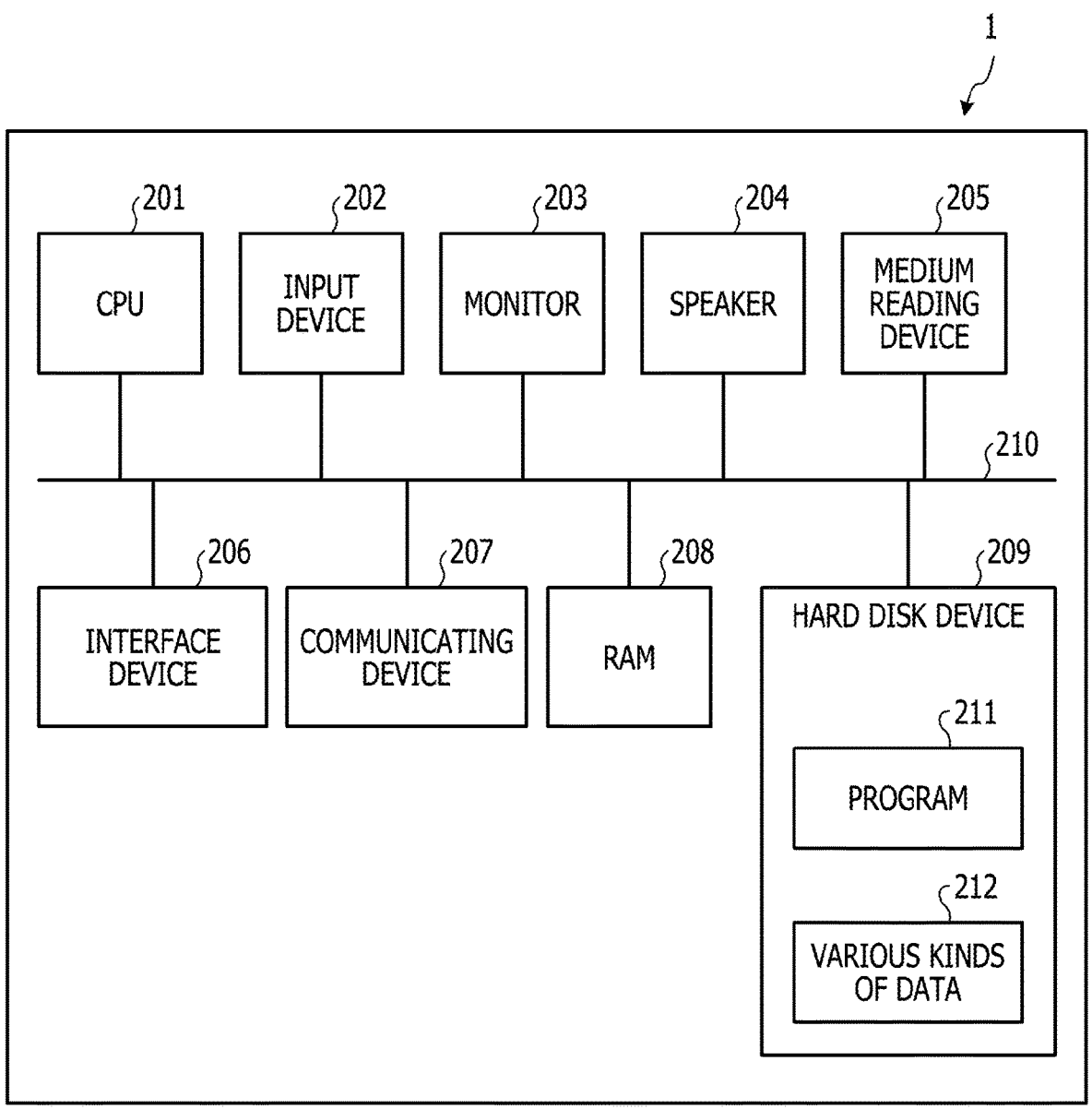
FIG. 16 is a block diagram illustrating an example of a hardware configuration of a text generating device according to an embodiment.

Various kinds of processing described in the foregoing embodiment may be implemented by executing a program prepared in advance on a computer. Accordingly, the following description will be made of an example of a computer (hardware) that executes a program having functions similar to those of the foregoing embodiment. FIG. 16 is a block diagram illustrating an example of a hardware configuration of a text generating device according to an embodiment. The text generating device described illustrated in FIG. 16 may be the text generating device 1 illustrated in FIG. 1.

As illustrated in FIG. 16, the text generating device 1 includes a CPU 201 that executes various kinds of arithmetic processing, an input device 202 that receives data input, a monitor 203, and a speaker 204. In addition, the text generating device 1 includes a medium reading device 205 that reads a program or the like from a storage medium, an interface device 206 for coupling with various kinds of devices, and a communicating device 207 for communication coupling with an external apparatus by wire or radio. In addition, the text generating device 1 includes a random access memory (RAM) 208 that temporarily stores various kinds of information and a hard disk device 209. In addition, the units (201 to 209) within the text generating device 1 are coupled to a bus 210.

The hard disk device 209 stores a program 211 for performing various kinds of processing related to the text generation processing unit 10 described in the foregoing embodiment. In addition, the hard disk device 209 provides functions as the storage unit 20 described in the foregoing embodiment, and stores various kinds of data 212 that the program 211 refers to. The input device 202, for example, receives an input of operation information from an operator of the text generating device 1. The monitor 203, for example, displays various kinds of screens operated by the operator. The interface device 206 is, for example, coupled with a printing device. The communicating device 207 is coupled to a communication network such as a LAN, and exchanges various kinds of information with an external apparatus via the communication network.

The CPU 201 performs various kinds of processing related to the text generation processing unit 10 by reading the program 211 stored in the hard disk device 209, expanding the program 211 in the RAM 208, and executing the program 211. Incidentally, the program 211 may not be stored in the hard disk device 209. For example, the program 211 stored on a storage medium readable by the text generating device 1 may be read and executed by the text generating device 1. The following, for example, corresponds to the storage medium readable by the text generating device 1: a portable recording medium such as a compact disc read only memory (CD-ROM), a digital versatile disc (DVD), or a universal serial bus (USB) memory, a semiconductor memory such as a flash memory, a hard disk drive, or the like. In addition, the program may be stored in devices coupled to a public circuit, the Internet, a LAN, or the like, and the text generating device 1 may read the program 211 from these devices and execute the program 211.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A text generating device comprising:
   a memory; and
   a processor coupled to the memory and configured to:
      generate first context data representing a context of correction target text based on the correction target text, and
      correct an error in the correction target text by inputting a character string of the correction target text, the generated first context data, and meta-information corresponding to the correction target text to a neural network that has been trained to correct an error in the correction target text by inputting a character string of text corresponding to training data, second context data representing a context of the text, and meta-information of the text.

2. The text generating device of claim 1, wherein:
   the correction target text is a telop of a moving image; and
   the meta-information is a position of the telop in the moving image, an attribute of the moving image, or voice text representing contents of voice, or any combination thereof.

3. The text generating device of claim 1, wherein the neural network is a bidirectional neural network that receives input of the character string of the correction target text from both a forward direction and a backward direction of arrangement order of the character string, and outputs the character string in which an error is corrected.

4. The text generating device of claim 1, wherein each of the first context data and the second context data is configured as a context vector in which degrees of co-occurrence of a given word within a text and words appearing at front and at rear of the given word or in a vicinity of the given word are arranged according to order of appearing words.

5. A non-transitory, computer-readable recording medium having stored therein a program for causing a computer to execute a process comprising:
   generating first context data representing a context of correction target text based on the correction target text; and
   correcting an error in the correction target text by inputting a character string of the correction target text, the generated first context data, and meta-information corresponding to the correction target text to a neural network that has been trained to correct an error in the correction target text by inputting a character string of text corresponding to training data, second context data representing a context of the text, and meta-information of the text.

6. The non-transitory, computer-readable recording medium of claim 5, wherein:
   the correction target text is a telop of a moving image; and
   the meta-information is a position of the telop in the moving image, an attribute of the moving image, or voice text representing contents of voice, or any combination thereof.

7. The non-transitory, computer-readable recording medium of claim 5, wherein the neural network is a bidirectional neural network that receives input of the character string of the correction target text from both a forward direction and a backward direction of arrangement order of the character string, and outputs the character string in which an error is corrected.

8. The non-transitory, computer-readable recording medium of claim 5, wherein each of the first context data and the second context data is configured as a context vector in which degrees of co-occurrence of a given word within a text and words appearing at front and at rear of the given word or in a vicinity of the given word are arranged according to order of appearing words.

9. A text generating method performed by a computer, the text generating method comprising:
   generating context data representing a context of correction target text based on the correction target text; and
   correcting an error in the correction target text by inputting a character string of the correction target text, the generated context data, and meta-information corresponding to the correction target text to a neural network that has been trained to correct an error in the correction target text by inputting a character string of text corresponding to training data, second context data representing a context of the text, and meta-information of the text.

10. The text generating method of claim 9, wherein:
    the correction target text is a telop of a moving image; and
    the meta-information is a position of the telop in the moving image, an attribute of the moving image, or voice text representing contents of voice, or any combination thereof.

11. The text generating method of claim 9, wherein the neural network is a bidirectional neural network that receives input of the character string of the correction target text from both a forward direction and a backward direction of arrangement order of the character string, and outputs the character string in which an error is corrected.

12. The text generating method of claim 9, wherein each of the first context data and the second context data is configured as a context vector in which degrees of co-occurrence of a given word within a text and words appearing at front and at rear of the given word or in a vicinity of the given word are arranged according to order of appearing words.

* * * * *